(12) United States Patent
Jackson, Jr.

(10) Patent No.: US 9,177,041 B2
(45) Date of Patent: Nov. 3, 2015

(54) AUTOMATED STRATIFICATION OF GRAPH DISPLAY

(76) Inventor: Robert Lewis Jackson, Jr., Beitar Illit (IL)

(*) Notice: Subject to any disclaimer, the term of this patent is extended or adjusted under 35 U.S.C. 154(b) by 259 days.

(21) Appl. No.: 13/413,477

(22) Filed: Mar. 6, 2012

(65) Prior Publication Data

US 2013/0235040 A1    Sep. 12, 2013
US 2015/0112994 A9    Apr. 23, 2015

Related U.S. Application Data

(63) Continuation-in-part of application No. 13/226,270, filed on Sep. 6, 2011, now Pat. No. 9,128,998.

(60) Provisional application No. 61/380,060, filed on Sep. 30, 2010.

(51) Int. Cl.
*G06T 11/20* (2006.01)
*G06F 17/30* (2006.01)

(52) U.S. Cl.
CPC .... *G06F 17/30598* (2013.01); *G06F 17/30958* (2013.01); *G06T 11/206* (2013.01)

(58) Field of Classification Search
CPC .................................................. G06T 11/206
USPC ....................................................... 345/440
See application file for complete search history.

(56) References Cited

U.S. PATENT DOCUMENTS 5,749,079 A *   5/1998  Yong et al.
6,105,018 A     8/2000  Demers et al.
6,175,836 B1 *  1/2001  Aldred
6,377,287 B1 *  4/2002  Hao et al. ...................... 715/853
6,567,802 B1 *  5/2003  Popa et al.
6,763,361 B1 *  7/2004  Poskanzer ..................... 707/802
6,772,180 B1 *  8/2004  Li et al. .......................... 715/229
6,801,905 B2 * 10/2004  Andrei
7,103,600 B2 *  9/2006  Mullins (Continued)

OTHER PUBLICATIONS

Sentissi, T. ; Univ. Claude Bernard, Villeurbanne, France ; Pichat, E. "A graphical user interface for object-oriented database" 1997 IEEE.*

(Continued)

*Primary Examiner* — Javid A Amini
(74) *Attorney, Agent, or Firm* — Edward J. Radlo; Radlo IP Law Group

(57) ABSTRACT

A method and apparatus for generating a graphical depiction of related data are provided. Non-transitory computer-readable media having computer-executable instructions embodied thereon, wherein when executed by at least one processor, the computer-executable instructions cause the processor to identify a graph wherein a node represents a stored object having one or more application-specific attributes associated with a primary application, wherein the primary application includes other than a presentation of nodes in a graph drawing, and wherein edges represent stored relationships between said objects, which include a relevancy to the primary application. The computer-executable instructions further cause the processor to receive a selection formula wherein the selection formula is based on the one or more application-specific attributes of the objects, and wherein the formula classifies the objects based on at least one of predetermined and selectable values of the attributes; and depict a visual representation of the graph.

20 Claims, 14 Drawing Sheets

(56) References Cited

U.S. PATENT DOCUMENTS

| | | | |
|---|---|---|---|
| 7,366,723 B2 | 4/2008 | Shaburov | |
| 8,051,105 B1 | 11/2011 | Johnson | |
| 8,392,467 B1 | 3/2013 | Johnson | |
| 8,401,292 B2* | 3/2013 | Park et al. | 382/173 |
| 8,832,111 B2* | 9/2014 | Venkataramani et al. | 707/741 |
| 8,978,010 B1* | 3/2015 | Thumfart et al. | 717/123 |
| 8,983,898 B1* | 3/2015 | Alfonseca et al. | 707/603 |
| 2003/0065527 A1 | 4/2003 | Yeh et al. | |
| 2003/0115545 A1* | 6/2003 | Hull et al. | 715/500 |
| 2004/0181554 A1* | 9/2004 | Heckerman et al. | 707/104.1 |
| 2004/0215649 A1 | 10/2004 | Whalen et al. | |
| 2004/0249809 A1* | 12/2004 | Ramani et al. | 707/4 |
| 2005/0251371 A1 | 11/2005 | Chagoly et al. | |
| 2006/0015588 A1* | 1/2006 | Achlioptas et al. | 709/220 |
| 2006/0253476 A1* | 11/2006 | Roth et al. | 707/100 |
| 2007/0180408 A1* | 8/2007 | Rusu et al. | 715/855 |
| 2008/0056572 A1* | 3/2008 | Nielsen | 382/173 |
| 2008/0294641 A1 | 11/2008 | Kim | |
| 2009/0080853 A1* | 3/2009 | Chen et al. | 386/52 |
| 2009/0094217 A1 | 4/2009 | Dettinger et al. | |
| 2009/0175543 A1* | 7/2009 | Nielsen | 382/204 |
| 2009/0182837 A1* | 7/2009 | Rogers | 709/215 |
| 2009/0296568 A1* | 12/2009 | Kitada | 370/221 |
| 2010/0214313 A1* | 8/2010 | Herman et al. | 345/593 |
| 2011/0270606 A1 | 11/2011 | Crochet et al. | |
| 2012/0229466 A1* | 9/2012 | Riche et al. | 345/440 |
| 2013/0174129 A1* | 7/2013 | Grammel et al. | 717/136 |
| 2013/0325864 A1* | 12/2013 | Sarshar et al. | 707/737 |
| 2014/0304214 A1* | 10/2014 | Sakunkoo et al. | 706/55 |

OTHER PUBLICATIONS

Jessie Kennedy and Peter Barclay (EDS) 'Interfaces to Databases (IDS-3)' Proceedings of the 3rd International Workshop on Interfaces to Databases, Napier University, Edinburgh, Jul. 8-10, 1996.*

Graph rewrite systems for program optimization Uwe Assmann Jul. 2000 Transactions on Programming Languages and Systems (TOPLAS), vol. 22 Issue 4, Publisher: ACM.*

Graph-based KNN text classification Zonghu Wang ; Zhijing Liu Fuzzy Systems and Knowledge Discovery (FSKD), 2010 Seventh International Conference on vol. 5 DOI: 10.1109/FSKD.2010.5569866 Publication Year: 2010, pp. 2363-2366.*

T. Sentissi, E. Pichat, "A graphical user interface for object-oriented database," sccc, pp. 227, 17th International Conference of the Chilean Computer Science Society (SCCC '97), 1997.

P. Sawyer, I. Sommerville, "User interface tools for object-oriented database systems," IEE Colloquium on Software Tools for Interface Design, Nov. 8, 1990, pp. 9/1-9/4, London.

An International Preliminary Report on Patentability (PCT/IB/373) and a Written Opinion of the International Searching Authority (PCT/ISA/237) dated Mar. 14, 2013 for co-pending International Application No. PCT/US2011/050567 (7 pgs).

International Search Report and Written Opinion of the International Searching Authority dated Jan. 24, 2012 for International Application No. PCT/US2011/050567, 12 pgs.

Using Hibernate in a Java Swing Application, product tutorial retrieved from Website http://netbeans.org/kb/docs/java/hibernate-java-se.html in 2012 (12 pgs.).

View (database), retrieved from Wikipedia at http://en.wikipedia.org/wiliNew_(database), version dated Jan. 24, 2012 (3 pgs.).

Welcome to the dbViz, Database Visualizer project!!, retrieved from Website http://jdbv.sourceforge.nel/dbViz/, copyright 2003, 1 page.

* cited by examiner

| Name | Type | Owner | Project | Modified | Folder | Alias |
|---|---|---|---|---|---|---|
| Documents | Folder | ADMIN | General | 2012-03-01 | C: | No |
| Disclaimer | JAVA | FG | Sales | 2009-09-24 | Code | No |
| Register | JAVA | FG | Market | 2010-04-03 | Code | No |
| Downloadinst | JAVA | JP | Sales | 2012-02-20 | Code | No |
| GetData | JAVA | FG | Sales | 2012-03-01 | Code | No |
| ICON | JPEG | MM | General | 2009-08-30 | Current | No |
| Manual | PDF | SL | Training | 2012-02-19 | Current | No |
| Installer | EXE | JP | Sales | 2012-02-20 | Current | No |
| LetterText | TEXT | MM | Market | 2012-02-28 | Current | No |
| Main | HTML | JP | General | 2012-03-01 | Current | No |
| Code | Folder | FG | General | 2012-03-01 | Current | No |
| Fred | Folder | FG | General | 2012-02-28 | Documents | No |
| Mindy | Folder | MM | General | 2010-08-03 | Documents | No |
| Jeff | Folder | JP | General | 2011-11-11 | Documents | No |
| Paul | Folder | PT | General | 2012-02-27 | Documents | No |
| Sally | Folder | SL | General | 2012-02-28 | Documents | No |
| Promo | Folder | MM | General | 2012-03-01 | Documents | No |
| Video | Folder | PT | General | 2012-03-01 | Promo | No |
| Data | Folder | JP | General | 2012-03-01 | Promo | No |
| Current | Folder | JP | General | 2012-03-01 | Promo | No |
| Quick Intro | WMV | MM | Market | 2011-12-14 | Video | No |
| Tutorial | AVE | JP | Training | 2012-03-01 | Video | No |
| Preferences | TS | FG | General | 2011-12-03 | Fred | No |
| Customers | Data | MM | Sales | 2012-03-01 | Accounts | No |
| Accounts | Folder | MM | Sales | 2012-03-01 | Documents | No |
| Accounts | Folder | MM | Sales | 2012-03-01 | Promo | Yes |
| Quick Intro | WMV | MM | Market | 2011-12-14 | Current | Yes |
| ICON | JPEG | MM | General | 2009-08-30 | Code | Yes |

FIG. 5

AUTOMATED STRATIFICATION OF GRAPH DISPLAY

CROSS REFERENCE TO RELATED APPLICATIONS

This application is a continuation-in-part of U.S. patent application Ser. No. 13/226,270 filed Sep. 6, 2011, which claims the priority benefit of U.S. provisional patent application 61/380,060 filed Sep. 3, 2010.

BACKGROUND OF THE INVENTION

The subject matter disclosed herein relates generally to graph representation and, more specifically, to node positioning within stratified graph representations based upon attributes of represented objects.

At least some known graph drawing tools are designed to implement graph drawing algorithms that can either import or receive from a user interactively sets of properties for nodes that are relevant to their display in a visual representation of the graph. For example, a label or text for a node may be imported or specified by a user interactively, and the size of a name might influence the size of one or more of the nodes. As another example, dimensions, color, and perhaps positioning requirements might be specified by a user or imported. These node properties influence the drawing of the graph.

However, these properties do not necessarily reflect the nature of the objects represented by nodes directly. For example, a graph might be generated wherein nodes represent employees within a company. The data representing employees might specify a number of properties about each employee, such as name, department, education level, seniority, position, and so on. At least some texts that present graph drawing algorithms do not present algorithms that directly access such information stored about node objects. A user might specify positioning requirements, or labels or text based upon any number of such properties, and might further specify them programmatically; however, the algorithm for placing the nodes within a drawing does not directly consider information stored about the objects themselves.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, one or more non-transitory computer-readable media having computer-executable instructions embodied thereon are provided. When executed by at least one processor, the computer-executable instructions cause the processor to: identify a graph wherein a node represents a stored object having one or more application-specific attributes associated with a primary application, wherein the primary application includes other than a presentation of nodes in a graph drawing, and wherein edges represent stored relationships between said objects, which include a relevancy to the primary application. The computer-executable instructions further cause the processor to receive a selection formula wherein the selection formula is based on the one or more application-specific attributes of the objects, and wherein the formula classifies the objects based on at least one of predetermined and selectable values of the attributes; and depict a visual representation of the graph, in which a plurality of nodes areas are reserved for individual object classifications, a plurality of nodes for objects of a classification as determined by the formula appear in a respective classification node area, the node objects are presented as nodes contained within nodes areas for the classification groupings at a time at least subsequent to their creation, and a plurality of the stored edges are shown joining nodes contained in one classification node area to nodes contained in a second one or more classification node areas, and a plurality of the stored edges are shown joining nodes contained within the same classification node area.

In another aspect, a method of generating a graphical depiction of related data using attributes of the data to position representations of the data on a graph includes identifying a graph wherein a node represents a stored object having one or more application-specific attributes associated with a primary application wherein the primary application includes other than a presentation of nodes in a graph drawing, and wherein edges represent stored relationships between said objects, which include a relevancy to the primary application. The method further includes receiving a selection formula, said selection formula based on the one or more application-specific attributes of the objects, wherein the formula classifies the objects based on at least one of predetermined and selectable values of the attributes; and depict a visual representation of the graph, in which a plurality of nodes areas are reserved for individual object classifications, a plurality of nodes for objects of a classification as determined by the formula appear in a respective classification node area, the node objects are presented as nodes contained within nodes areas for the classification groupings at a time at least subsequent to their creation; and a plurality of the stored edges are shown joining nodes contained in one classification node area to nodes contained in one or more classification node areas, and a plurality of the stored edges are shown joining nodes contained within the same classification node area.

In yet another aspect, a display device includes a memory device and a processor coupled to the memory device, the processor programmed to identify a graph wherein a node represents a stored object having one or more application-specific attributes associated with a primary application, said primary application comprising other than a presentation of nodes in a graph drawing, and wherein edges represent stored relationships between said objects, which include a relevancy to the primary application. The processor is further programmed to receive a selection formula that is based on the one or more application-specific attributes of the objects, wherein the formula classifies the objects based on at least one of predetermined and selectable values of the attributes. The processor is further programmed to depict a visual representation of the graph in which a plurality of nodes areas are reserved for individual object classifications, a plurality of nodes for objects of a classification as determined by the formula appear in a respective classification node area, the node objects are presented as nodes contained within nodes areas for the classification groupings at a time at least subsequent to their creation, and a plurality of the stored edges are shown joining nodes contained in one classification node area to nodes contained in a second one or more classification node areas, and a plurality of the stored edges are shown joining nodes contained within the same classification node area.

BRIEF DESCRIPTION OF THE DRAWINGS

The embodiments described herein may be better understood by referring to the following description in conjunction with the accompanying drawings.

FIG. 5 is a table illustrating application-specific object data in accordance with an exemplary embodiment of the present invention, the specific example being a list of files and folders with various attribute values stored within respective columns.

DETAILED DESCRIPTION OF THE INVENTION

The past few decades have seen a movement towards graphical user interfaces and visualized presentation of data. One challenge of a graphical user interface is the balancing act of on the one hand taking advantage of the ability to present a lot of graphical information while on the other hand not overwhelming the user. In particular, these two mutual goals are relevant for presenting a graph, meaning a set of nodes with a set of edges between them. Graph nodes are able to present any type of objects, and graph edges can represent relationships between the objects. Graphs are therefore relevant to a vast number of applications, and user interfaces benefit tremendously from effective presentation of graphs. For example, a file directory system can be presented as a graph wherein nodes represent files and/or directories, and wherein directed edges represent a logical file location within a directory.

An exemplary technical effect of the methods, systems, and apparatus described herein includes at least one of (a) determining for each data object in the hierarchy, by a computing device, an associated node type to create a plurality of node types; (b) creating, by the computing device, a graphical representation of the hierarchy including a plurality of strata corresponding to the plurality of node types; (c) creating, by the computing device, a plurality of tree nodes representing the data objects, each tree node associated with the node type that corresponds to the associated data object; (d) including in each stratum of the plurality of strata, by the computing device, the tree nodes associated with the node type that corresponds to the stratum; (e) including in the graphical representation hierarchical connectors extending between the tree nodes, wherein the hierarchical connectors represent hierarchical relationships between the data objects represented by the tree nodes; and (f) providing the graphical representation of the hierarchy for presentation to a user.

Figure 1:
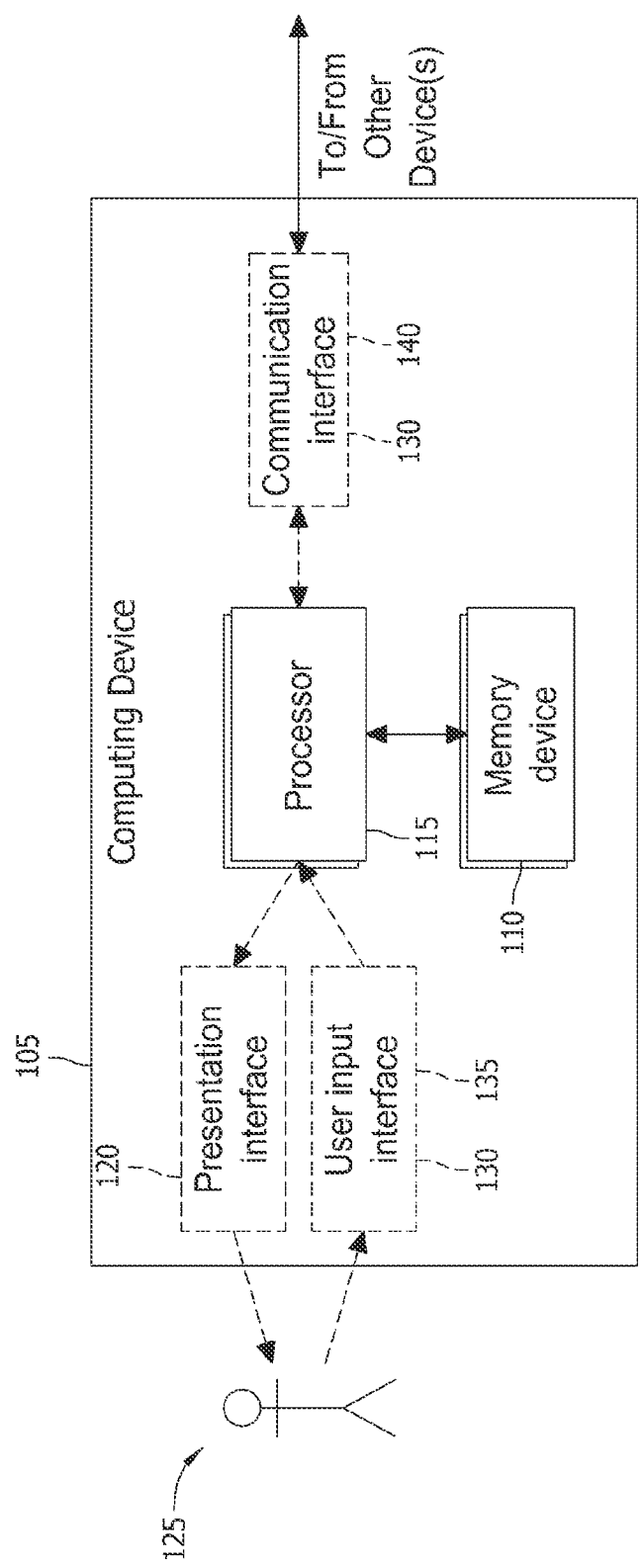
FIG. 1 is a block diagram of an exemplary computing device.

FIG. 1 is a block diagram of an exemplary computing device 105. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

Memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, a hierarchy of data objects, node types, available classification strategies, computer-executable instructions, and/or any other type of data.

In some embodiments, computing device 105 includes a presentation interface 120 that is coupled to processor 115. Presentation interface 120 presents information, such as data objects and/or classification strategies, to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer.

In some embodiments, computing device 105 includes an input interface 130, such as a user input interface 135 or a communication interface 140. Input interface 130 may be configured to receive any information suitable for use with the methods described herein.

In exemplary embodiments, user input interface 135 is coupled to processor 115 and receives input from user 125. User input interface 135 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 135.

Communication interface 140 is coupled to processor 115 and is configured to be coupled in communication with one or more remote devices, such as another computing device 105. For example, communication interface 140 may include, without limitation, a wired network adapter, a wireless network adapter, and/or a mobile telecommunications adapter. Communication interface 140 may also transmit data to one or more remote devices. For example, a communication interface 140 of one computing device 105 may transmit an indication of one or more source code portions of interest and/or one or more execution events to the communication interface 140 of another computing device 105.

Figure 2:
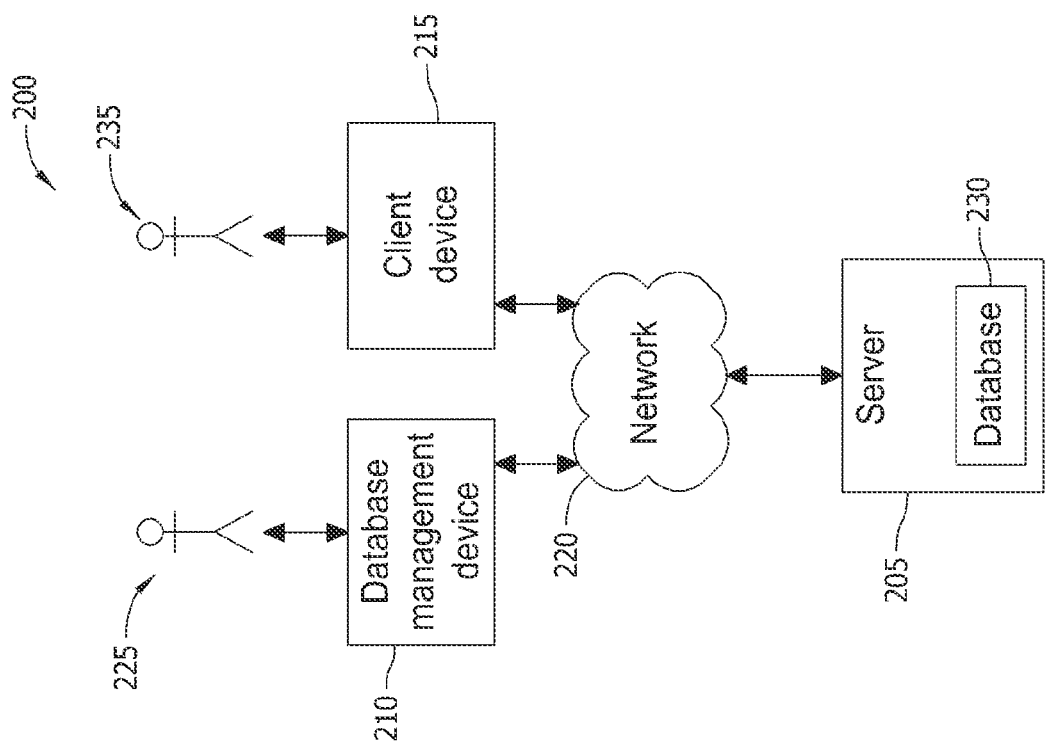
FIG. 2 is block diagram of an exemplary computing system that includes a server, a database management device, and a client device.

FIG. 2 is block diagram of an exemplary system 200 including a server 205, a database management device 210, and a client device 215 coupled in communication via a network 220. Network 220 may include, without limitation, the Internet, a local area network (LAN), a wide area network (WAN), a wireless LAN (WLAN), a mesh network, and/or a virtual private network (VPN). While certain operations are described below with respect to particular computing devices 105, it is contemplated that any computing device 105 may perform any portion or the entirety of the described operations.

In exemplary embodiments, server 205, database management device 210, and client device 215 are computing devices 105 (shown in FIG. 1). Each computing device 105 is coupled to network 220 via a communication interface 140 (shown in FIG. 1). In an alternative embodiment, server 205 is integrated with database management device 210 and/or with client device 215.

Server 205 stores data that is accessible by client device 215. In some embodiments, server 205 executes a database 230 that stores data in a structured format, such as tables with a plurality of columns and rows. In such embodiments, server 205 receives and responds to requests from database management device 210 and client device 215, as described in more detail below. In addition, or alternatively, server 205 may provide data to client device 215 from a source other than database 230. For example, server 205 may transmit files stored at server 205 or some other device to client device 215. As another example, server 205 may execute a software application, such as a web service, that provides data to client device 215.

Database management device 210 interacts with a database administrator 225 (e.g., via user input interface 135 and/or presentation interface 120). For example, database management device 210 may be configured to receive database schema data, such as definitions of tables and/or columns in a relational database, from database administrator 225. Database management device 210 transmits the schema data to server 205 via network 220. Server 205 receives and applies the schema data to database 230.

Client device 215 interacts with a user 235 (e.g., via user input interface 135 and/or presentation interface 120). For example, client device 215 may acquire and/or receive data objects provided by database 230 (e.g., product data, media data, education data, and/or any other type of data) and present such data to, user 235. For example, client device 215 may present data in stratified trees, as described in more detail below. Further, client device 215 may receive data from user 235 and submit the data to server 205, such that database 230 is updated with the submitted data.

In some embodiments, client device 215 is remote to server 205. For example, client device 215 may be located at a facility that is geographically removed from server 205 and/or database management device 210. Further, although client device 215 is described above as receiving data from server 205 and presenting the received data to user 235, in some embodiments, client device 215 presents data that is stored at client device 215. For example, client device 215 may execute database 230 and/or access data stored in one or more files at client device 215.

Figure 3:
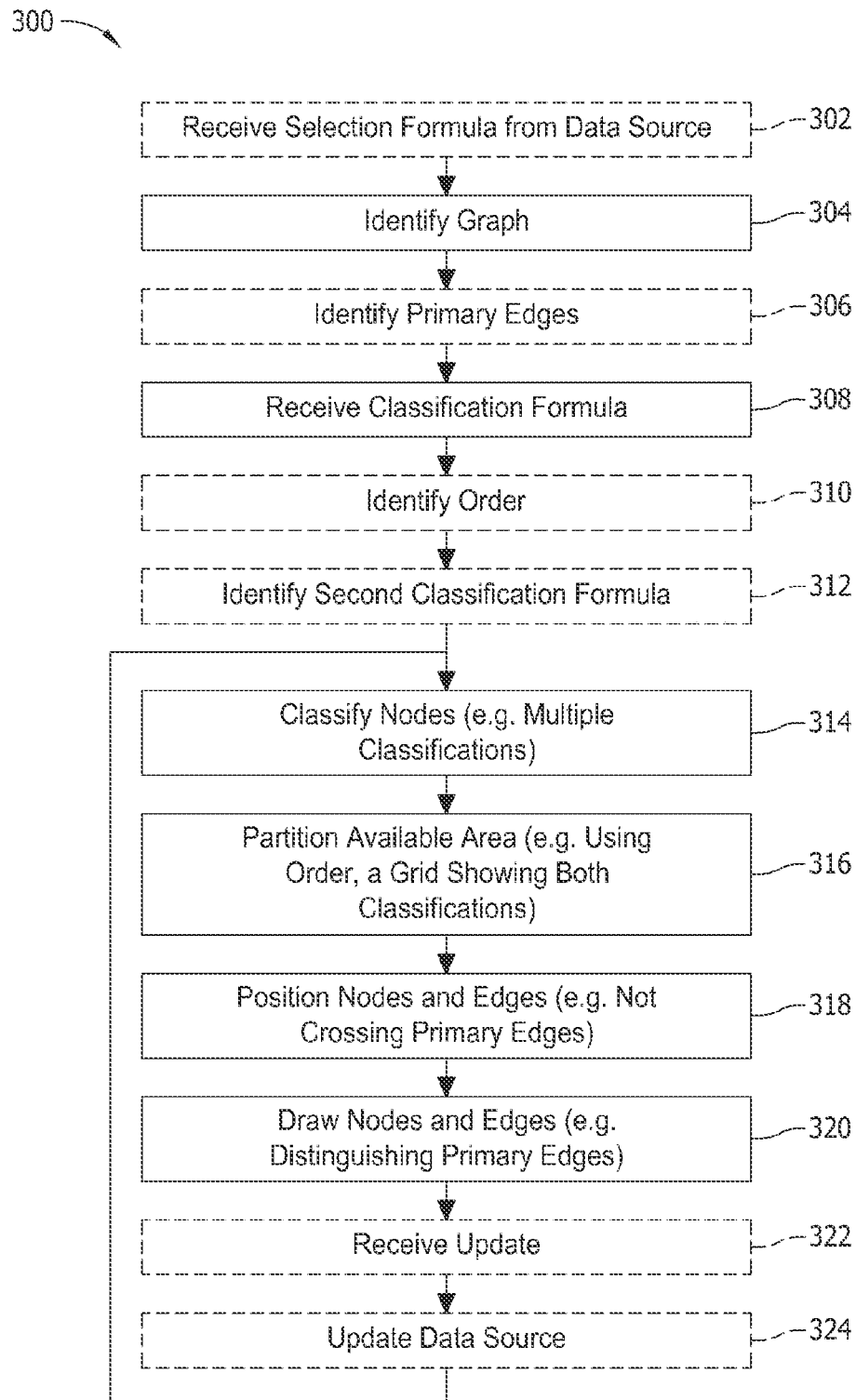
FIG. 3 is a flowchart of an exemplary method for use in automation of stratified graph representations.

FIG. 3 is a flowchart of an exemplary method 300 of generating a graphical depiction of related data using attributes of the data to position representations of the data on a graph. Portions of method 300 may be performed, for example, using any one of or any combination of computing devices 105 in system 200 (shown in FIG. 2). In the exemplary embodiment, method 300 includes receiving 302 a selection formula wherein the selection formula is based on the one or more application-specific attributes of the objects. The selection formula classifies the objects based on at least one of predetermined and selectable values of the attributes. Method 300 also includes identifying 304 a graph having a plurality of nodes representing stored objects having one or more application-specific attributes associated with a primary application. In the exemplary embodiment, the primary application does not include a presentation of nodes in a graph drawing. Edges are identified 306 and represent stored relationships between the objects and include a relevancy to the primary application. Method 300 also includes receiving 308 a classification formula and may include identifying 310 an order of strata being displayed in the generated graph. In some embodiments, a second or more classification formula is identified 312 if the displayed strata are to be segmented to provide additional details of the relationships between nodes.

Further, method 300 further includes classifying 312 the nodes, which may be an iterative process if more than a single classification is identified. The available area of the graph is portioned 316 in accordance with the attributes of the nodes and the classification formula(s). The nodes and edges are positioned 318 in their determined node areas such that primary edges do not cross. Method 300 further includes depicting 320 a visual representation of the graph wherein a plurality of nodes areas are reserved for individual object classifications, a plurality of nodes for objects of a classification as determined by the formula appear in a respective classification node area, the node objects are presented as nodes contained within nodes areas for the classification groupings at a time at least subsequent to their creation, and a plurality of the stored edges are shown joining nodes contained in one classification node area to nodes contained in one or more classification node areas, and a plurality of the stored edges are shown joining nodes contained within the same classification node area. Method 300 also includes receiving 322 data from the user and submitting the data to update 324 a source database with the submitted data.

Figure 4:
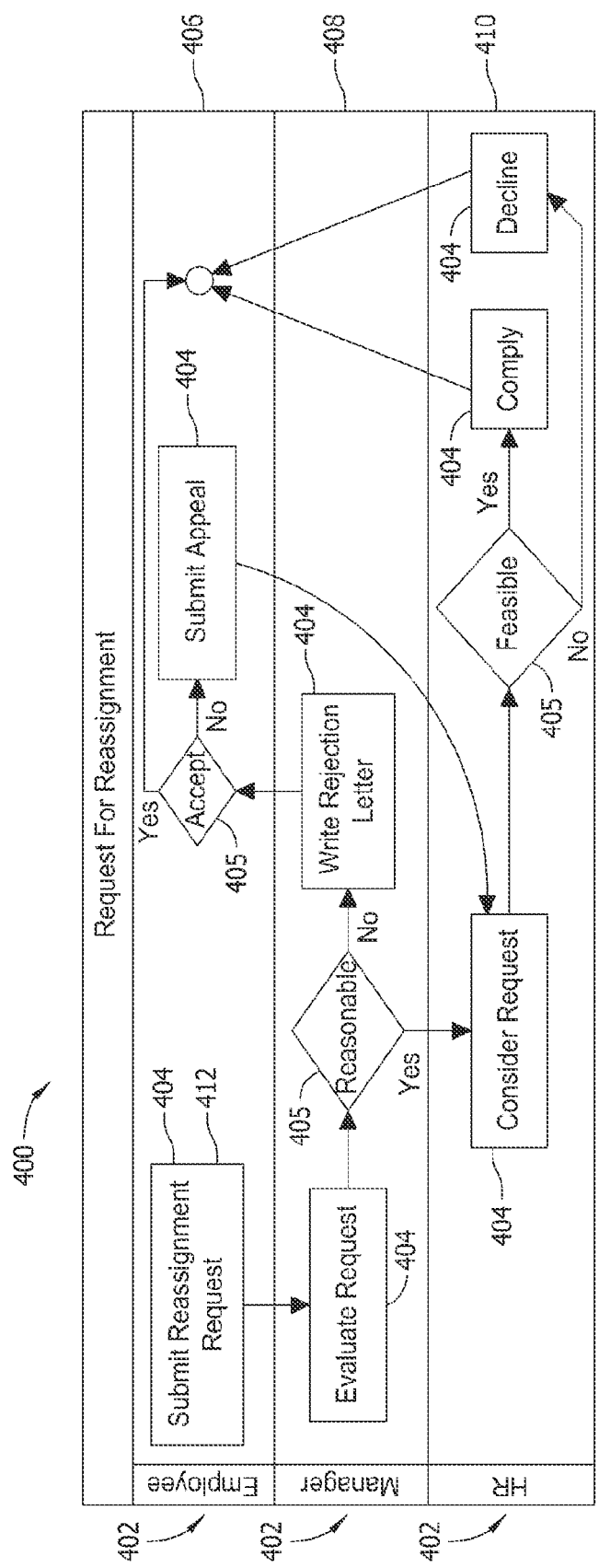
FIG. 4 illustrates a known swim lane flow chart.

FIG. 4 is a graph of a known swim lane flow chart 400. At least some known graphs are formed by positioning nodes within stratified regions of the graph based upon at least one classification. Swim lane flowcharts 400 are a standard representation of processes, wherein partitioned vertical or horizontal regions or lanes 402 represent process stages or steps that are relevant to a given department, group, or agent in general. At least some standard drawing and charting software tools allow user to specify a plurality of swim lanes 402, also referred to as functional bands, which are then represented visually as partitions. The user can then add nodes 404 and 405 interactively to separate lanes 402. At least some process design software tools allow a user to specify the objects in this manner, and then save data relevant to nodes 404 and 405, which can then used for various applications. However, the specification of lanes 402 precedes a creation of nodes 404 and 405, which are classified into lanes 402 manually by a user, rather than the nodes being classified by a processor based upon node object attributes.

FIG. 5 shows a table 500 of exemplary files and folders 502 (hereafter files and folders will be referred to collectively as files for simplicity unless the distinction between the two is relevant) wherein various file attributes 504 are stored in respective columns 506. Each row 508 contains attribute data relating to an associated file 502. A first column 502 contains a name for each file 502, and second column 510 indicates a file type. For example, file 502 with the name Disclaimer is a Java code file, so its type is JAVA. The remaining columns 504 indicate other attributes for each associated file, such as, an owner column 512 indicating an owner associated with each file, a project column 514 indicating a project to which the file may be associated. In the event that a file is not associated with the project, the project name by default is shown as General). Table 500 also includes a Modified column 516 that indicates the last date of modification of the respective file, a Folder column 518 that indicates the name of the folder where the file resides, and an Alias column 520 indicates if a file is actually an alias, meaning a virtual version of an actual file stored elsewhere, with a Yes value if the file is an alias and a No value if the file is not a virtual version. In the exemplary embodiment, the Disclaimer file is owned by the user FG, associated with a project called Sales, was last modified on Sep. 24, 2009, is stored in the directory "Code", and is not an alias.

Figure 6:
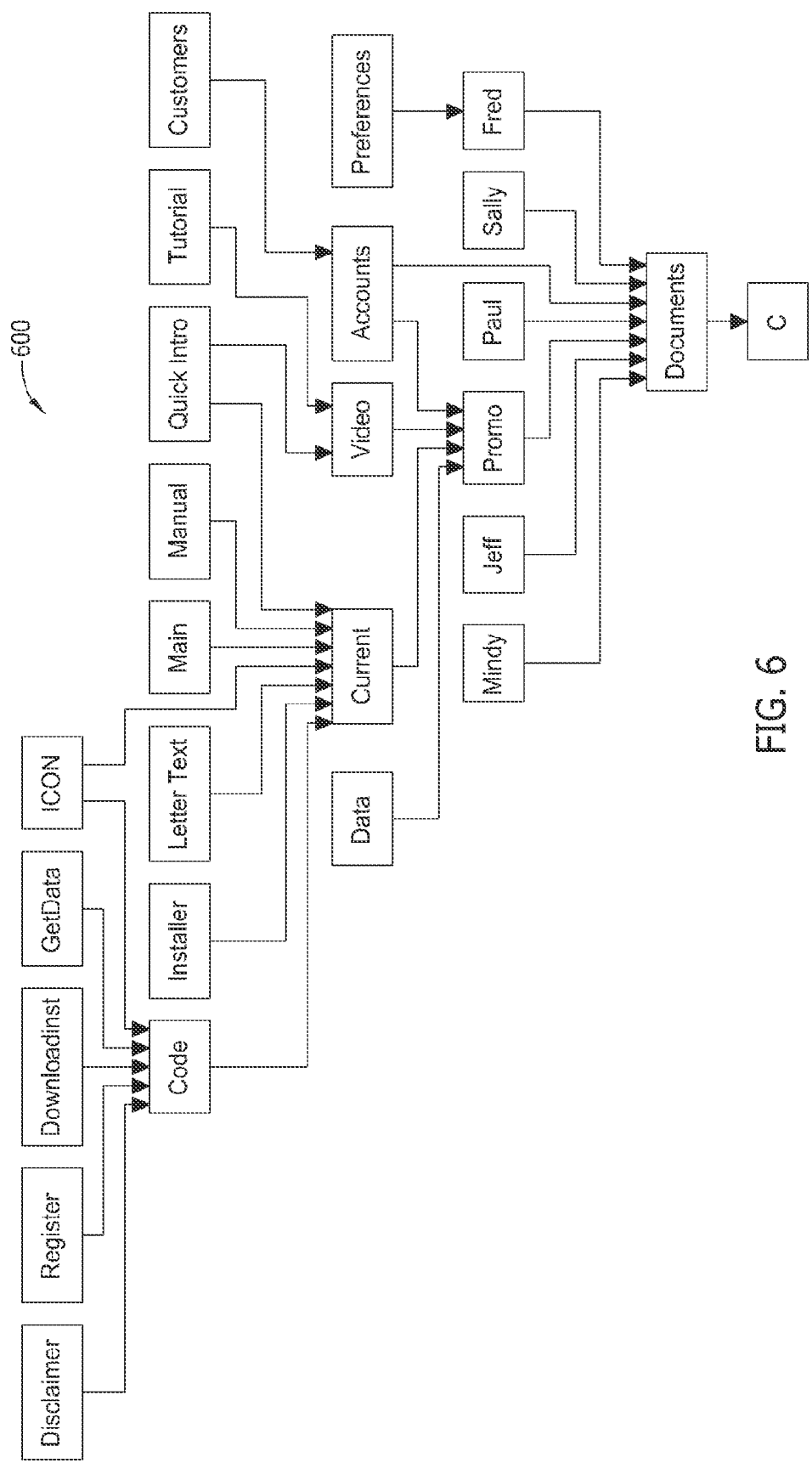
FIG. 6 is an exemplary standard hierarchical display of a graph, the graph being the file directory containing the files shown in FIG. 5.

As shown in FIG. 6, the files shown in table 500 in FIG. 5 can be presented as a graph 600. In the exemplary embodiment, each file receives a node, and the location of each file in a folder is indicated by an edge from the file to the folder. FIG. 6 shows the graph presented in a standard hierarchical format, wherein every file is shown positioned above its directory with a connecting edge from the file node to the directory node. For example, the Disclaimer file node appears above the Code folder node. For clarity, folder nodes are presented with a different background. Notably, some nodes are shown with edges to two folders, such as the ICON file mode, thereby indicating an actual location as well as an alias location. All files are stored directly or with in subdirectories of the directory Documents, which is itself contained within the root directory C:

As FIG. 6 shows, graph 600 that illustrates relationships between files and folders accurately, but has the disadvantage of being visually complex, even with a small number of nodes. A user or viewer might feel "lost" by the level of detail shown. In fact, most file directory interfaces show the files for only one current directory at a time, often as a list with file type shown by icon, and at least some show the path to the current directory from its root directory. However, this approach considerably limits the power of the user, because files from only one directory can be seen at a time in a window, and because other related directories within the hierarchy are often not visible. Showing a single directory path and its contents is an underutilization of a graphical interface, not fundamentally different than a directory listing in a textual interface.

Embodiments of the present invention facilitate presenting a graph to a user with the advantages of showing relationships represented by the graph and still presenting desired nodes with the simplicity of a list. Nodes can be stratified into partitions based upon classifications that make sense within the context of some current goal of a user or application. Such an approach is useful for presenting and managing any type of graph, for example, but not limited to a file directory interface, a network monitoring program, webpage history representation, and catalog product listings.

In one embodiment, a classification formula is programmed or preselected. In one embodiment, a program, interface, or website is preprogrammed to classify nodes based upon factors that may be determined dynamically, such as, for example, a user location. For example, a profile of a user may influence which types of books in a library catalog appear in a top stratum by default. In another embodiment, a user may dynamically specify desired classifications and sorting of strata, and may also modify selected classifications in order as desired.

One example of partitioning a graph is illustrated using a flowchart commonly referred to as a "swim lane diagram".

The nodes in a swim lane diagram are placed into vertical or horizontal bands, commonly referred to as "swim lanes", wherein each band is dedicated to showing nodes that are relevant to some attribute, for example, an individual, a group, a department, or an actor. As described above with reference to FIG. 4, an exemplary swim lane diagram demonstrates a process whereby an employee of a company petitions for receiving a task reassignment. There are three lanes in this flowchart, an Employee lane, a Manager lane 108, and a human resources (HR) lane 110. Rectangular blocks 104 indicate process steps, and diamonds 105 indicate conditional branches. For example, the process begins with an employee submitting a reassignment request 112. Because submitting a reassignment request 112 is performed by an employee, the node 104 representing submitting a reassignment request 112 is placed in Employee swim lane 106. The next step in flowchart 100, Evaluate Request 114, is performed by the manager for the employee, and therefore is placed within manager swim lane 108.

Swim lane diagrams are commonly acknowledged to be an effective way to present flowcharts, because the steps of the flowchart are less confusing when broken down between participants in the process. Many business process mapping tools build a user interface around a swim lane flowchart wherein the user initially determines swim lanes and then adds the nodes of the flowchart graph to the appropriate lanes. At least some such tools then store the separate steps as data objects and use them in various follow-up applications such as resource allocation tools.

However, the use of stratification based upon classification of nodes other than their proximity in a graph is largely limited to swim lane diagrams, and the decision of which in stratum to associate with a node is generally made by a user. Nodes 104 and 105 are presented as nodes of the graph at the time of their creation, and placed by the user into strata or lanes 102 as such, and only afterwards are associated with data objects for the sake of other applications.

Another usage of stratification uses an identified formula that takes as input stored attributes about data objects and generates nodes for those objects wherein the nodes are placed into strata based upon the classification provided by the formula. In one embodiment, a processor receives an identification of the objects and their classifying attributes from a data collection using at least one of querying, programmatic selection of stored data objects and attributes and interactive selection of stored data objects and attributes.

Specifically, the processor is configured to:

(a) identify a graph wherein a node represents a stored object having one or more application-specific attributes associated with a primary application wherein the primary application does not include a presentation of nodes in a graph drawing, and wherein edges represent stored relationships between the objects, which include a relevancy to the primary application;

(b) receive a selection formula wherein the selection formula is based on the one or more application-specific attributes of the objects, and wherein the formula classifies the objects based on at least one of predetermined and selectable values of the attributes; and (c) depict a visual representation of the graph wherein:
 (i) a plurality of node areas are reserved for individual object classifications;
 (ii) a plurality of nodes for objects of a classification as determined by the formula appear in a respective classification node area;

(iii) the node objects are presented as nodes contained within node areas for the classification groupings at a time at least subsequent to their creation; and (iv) a plurality of the stored edges are shown joining nodes contained in one classification node area to nodes contained in one or more classification node areas, and a plurality of the stored edges are shown joining nodes contained within the same classification node area.

Figure 7:
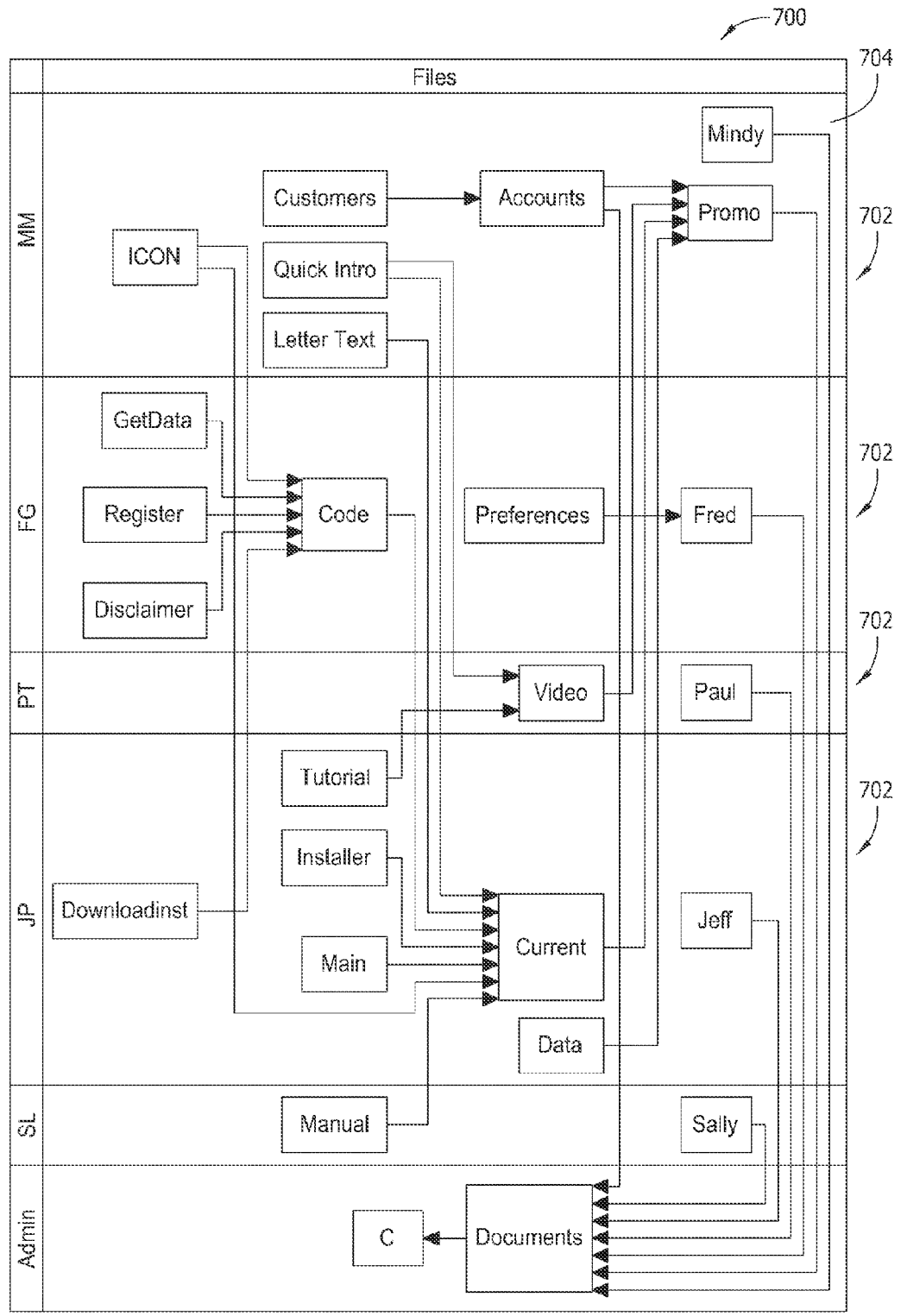
FIG. 7 is an exemplary user interface for a stratified graph, displaying a file directory graph stratified by owner.

For example, the file objects shown in FIG. 5 contain several different attributes as shown in table 500. If the data in table 500 were stored in some form accessible by the processor, such as within a relational database or a single spreadsheet or table, then the processor may use any of the attributes shown to classify the shown files. That classification may then be the basis for a stratified rendering of the directory tree as shown in FIG. 6. For example, if the processor received as a classification the owner of a given file, then the processor may generate a stratified graph 700 partitioned by the owner attribute such as the one shown in FIG. 7. Each stratum 702 in graph 700 depicts files owned by one owner, thereby allowing a user to see easily all of the files owned by a single individual or group. For example, a first stratum 704 shows files owned by MM. Notably, the user sees the entire graph 600 including all of the edges in FIG. 6, but is nevertheless presented with a simple set of files belonging to MM in FIG. 7 regardless of their directory.

This capability can be extended to include identifying an order among classifications; and depicting the graph with the classification node areas ordered according to the identified order. For example, the drawing of graph 700 shown in FIG. 7 places stratum 704 for MM in the top position of graph 700, which may be optimal for MM, but which may not be optimal for a different user. The processor may be presented with an ordering of strata 702 along with the classification formula that is optimized for current needs. For example, the processor might always show the stratum relevant to the current user on the top.

Figure 8:
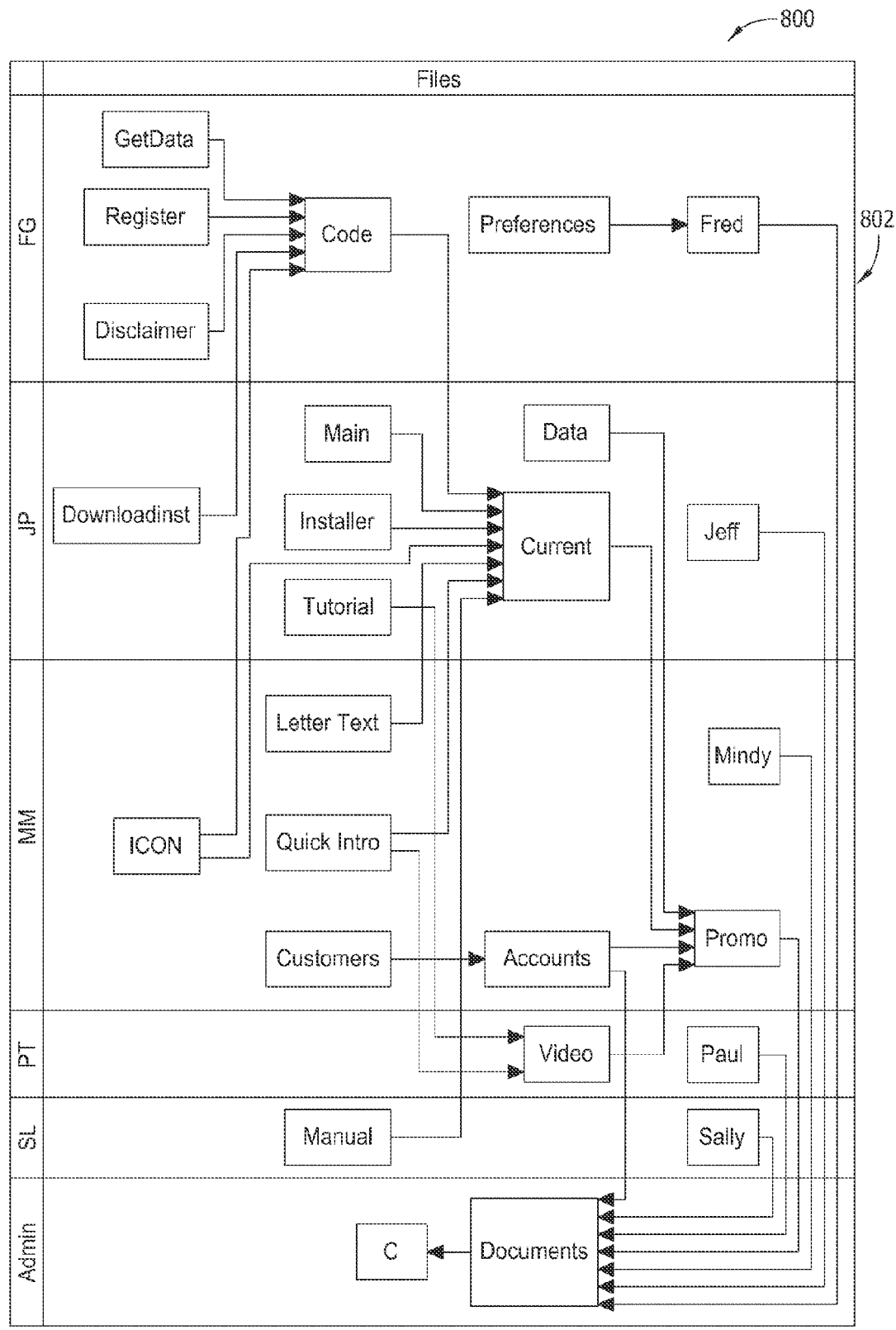
FIG. 8 is an exemplary user interface for a stratified graph with an identified sort order, displaying a file directory graph stratified by owner with the stratum of a desired owner shown at the top.

FIG. 8 shows a rendering of graph 700 using the same strata 702, but wherein a different ordering is shown, having a stratum 802 for owner FG at the top. Notably, the nodes in every stratum are the same as in FIG. 7, but the order is changed. In one embodiment, the processor may be programmed to position close together strata 702 that are considered relevant with respect to each other, such as owners in the same group or department within a company.

The formula for determining strata need not be limited to the values of single attributes. Furthermore, the formula may include conditional branching.

Figure 9:
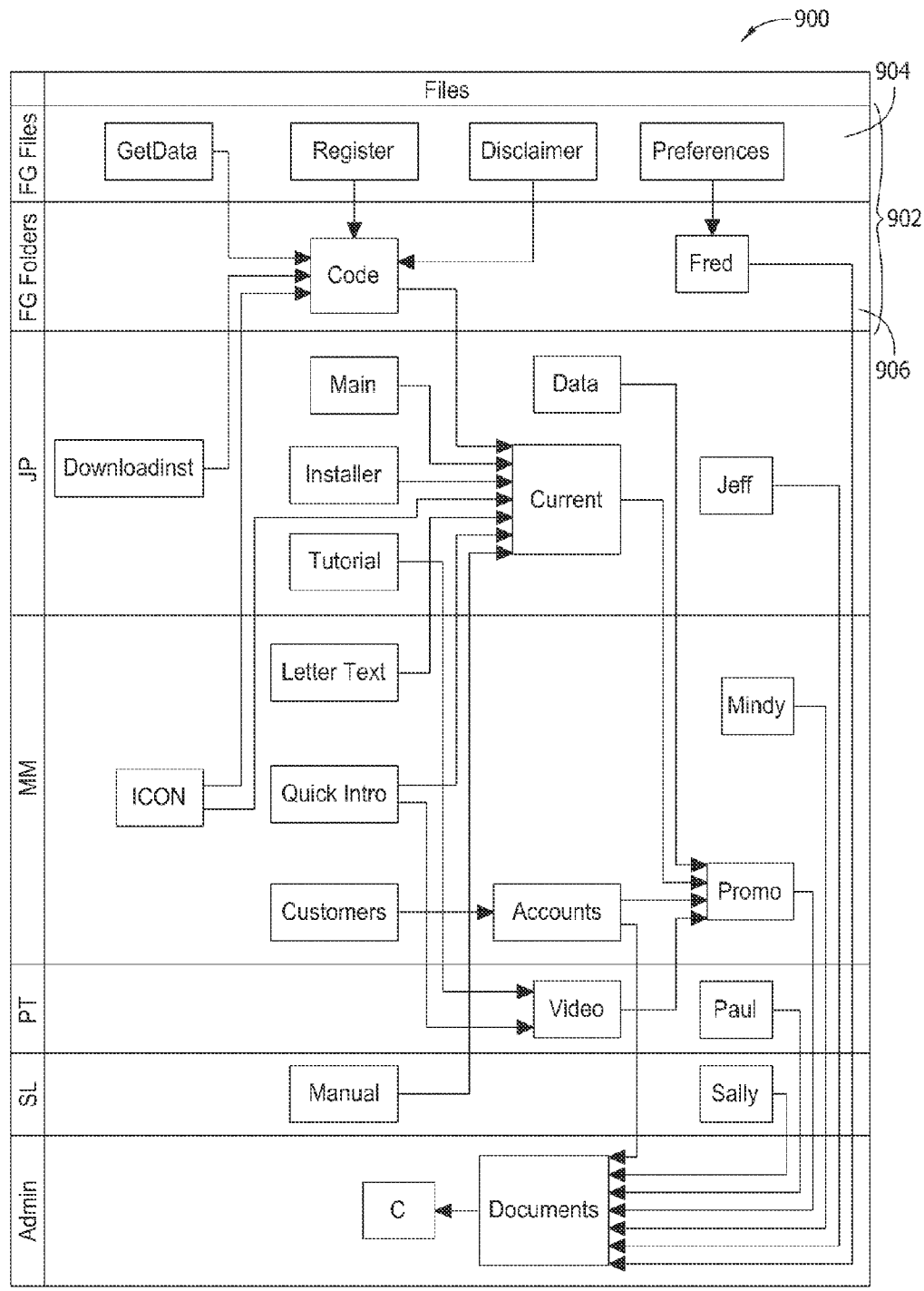
FIG. 9 is an exemplary user interface for a stratified graph showing a more complex classification formula, wherein the top stratum is subdivided into two strata.

FIG. 9 shows a depiction of a graph 900 similar to that shown in FIG. 8 except that a top stratum 902 is divided into two strata 904 and 906, wherein first stratum 904 of top stratum 902 shows files owned by FG having a type not equivalent to Folder, and second stratum 904 shows files owned by FG having the type Folder. Such a formula might be indicated as follows assuming that userNumber( ) is a function that maps users to integers:

if owner= <current user>, then {if type='Folder' then stratum=1 else stratum = 0} else {stratum=userNumber(<current user>)}.

One embodiment of the invention identifies a set of primary edges wherein no cycles exist within the primary edges. Any non-primary edges are herein referred to secondary edges. In one embodiment, secondary edges are displayed in a visually distinctive way, such as with different colors, line styles, or other stylistic distinctions. In another embodiment, the secondary edges are omitted from the depiction of graph 900 unless certain conditions occur, such as a user hovering a pointing device over a node which is a vertex to a secondary edge.

Figure 10:
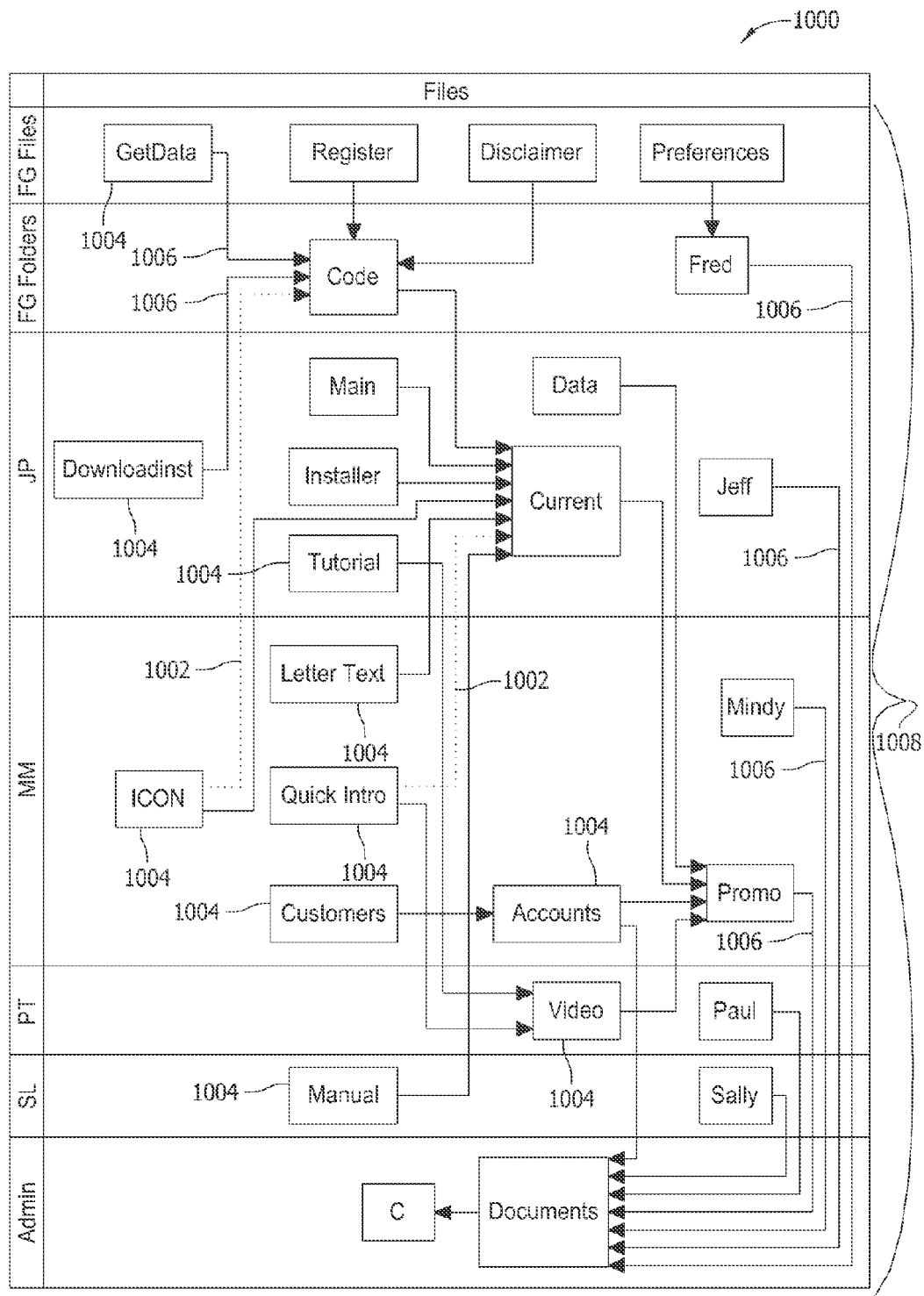
FIG. 10 is an exemplary user interface for a stratified graph with primary and secondary edges distinguished visually.

Because primary edges contain no cycles, they can be depicted without crossing edge lines. For example, if the aliasing of files is treated as secondary edges, then the remaining edges in FIG. 6 form a tree of primary edges. A graph 1000 depiction in FIG. 10 shows secondary edges 1002 drawn in a visually distinguished way as dashed lines rather than solid lines. The depiction is further altered from FIG. 9 to show all of the primary edges without any crossing of edge lines.

In one embodiment, nodes 1004 are positioned by traversing primary links 1006 forming a hierarchy of data objects depth-first (e.g., by beginning at a deepest level of the hierarchy), placing tree nodes representing the data objects into strata 1008 while progressing in a predetermined direction (e.g., left to right) in the hierarchy presented. The horizontal positioning of any node may be adjusted in a predetermined direction (e.g., to the right) to an extent that allows the node itself and any hierarchical connector(s) to be drawn without overlapping any other nodes or hierarchical connectors already drawn.

Another embodiment allows identification of multiple classification formulas which the processor uses in concert for placement of nodes into strata 1008. In one embodiment, the following steps are performed:

(a) identify a second formula for classification of the node objects;

(b) reserve node areas for the second formula classification wherein node areas for the first formula classification are further partitioned to include node areas for the second formula classification; and (c) depict a node within the intersecting node areas of the first classification and second classifications for the object represented by the node.

Figure 11:
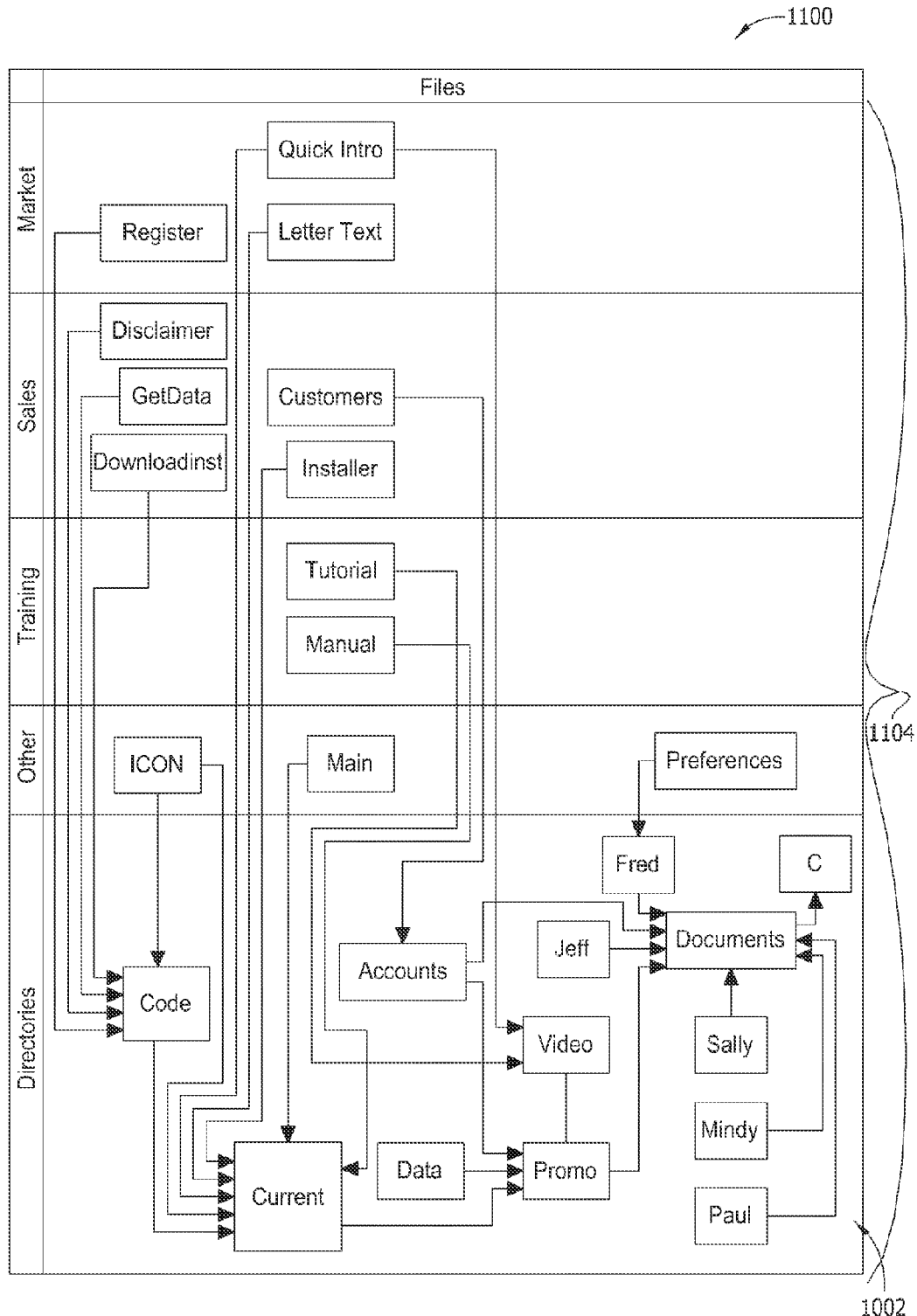
FIG. 11 is an exemplary user interface for a stratified graph, displaying a file directory graph stratified by project.

FIG. 11 shows graph 600 in FIG. 6 stratified by an associated project with folders placed in a separate stratum 1102. The formula for project stratification determines within which stratum 1104 of graph 1100 each node is depicted. Such a formula might be specified in pseudocode as:

if <type>='Folder' then {stratum=maxStratum} else stratum=stratumOf(project)}.

Figure 12:
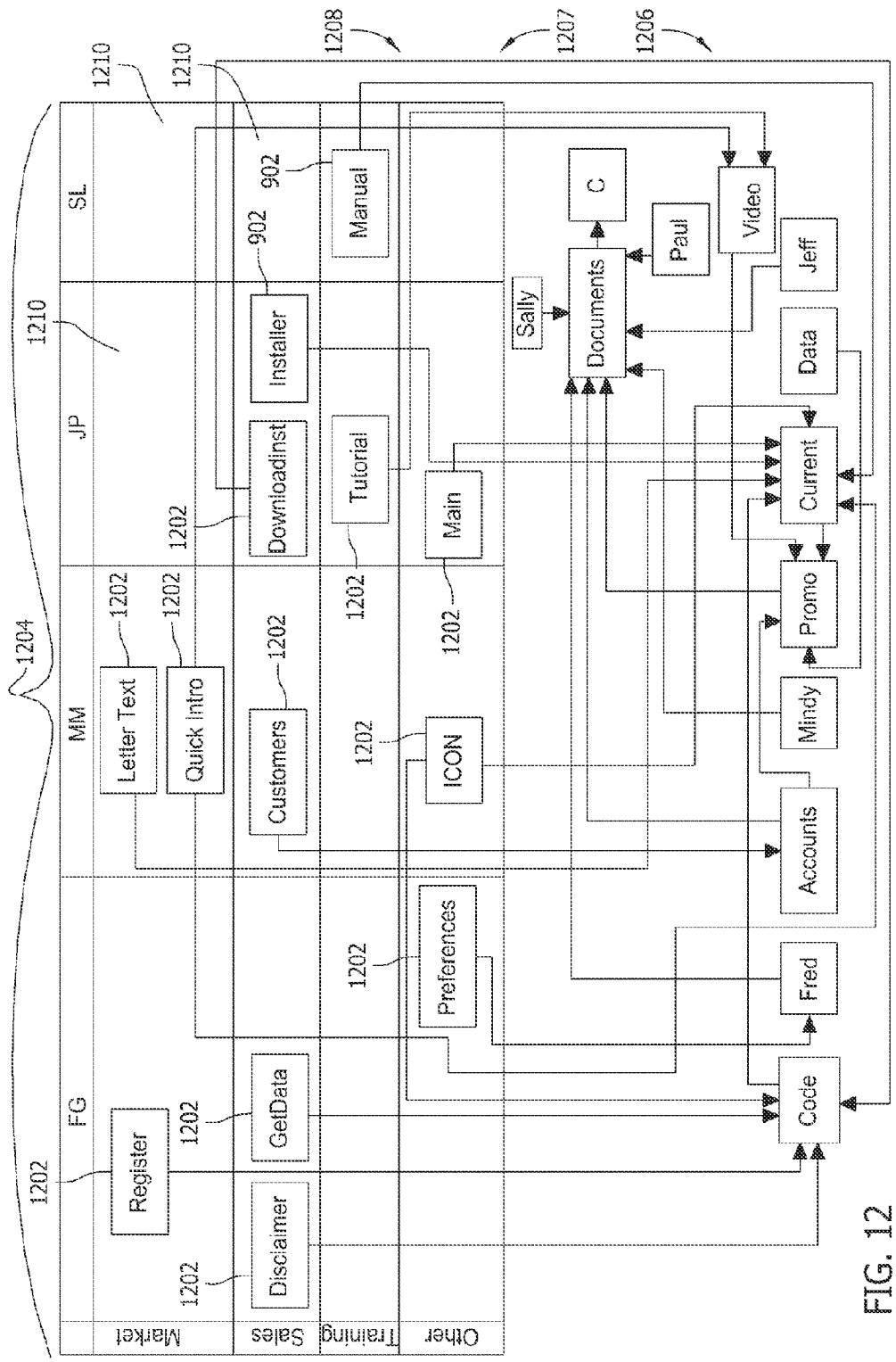
FIG. 12 is an exemplary user interface for a stratified graph with multiple classifications shown in a grid format, displaying a file directory graph stratified by both project and owner.

In FIG. 12, the same stratification formula is used, but nodes 1202 are further grouped into vertical strata 1204 based upon a different formula that shows owner. Notably, vertical strata 1204 do not include a folder stratum 1206, which is presented as separate from the grid 1207 of strata 1208.

Multiple classifications may be extended to as many classifications as desired using any standard approach to representing multiple dimensions of data. For example, each square 1210 of grid 1207 may be further subdivided into strata or grids to represent further detail.

In addition to subdividing a stratum into strata, one embodiment may provide a stratum and place the nodes within the stratum according to a system of coordinates to indicate values of particular node object attributes. For example, a timeline may be shown at the top of a stratum or graph, and nodes within a stratum may be placed within the stratum at the coordinate that identifies the time or date that is relevant to the application for the object of the node.

Figure 13:
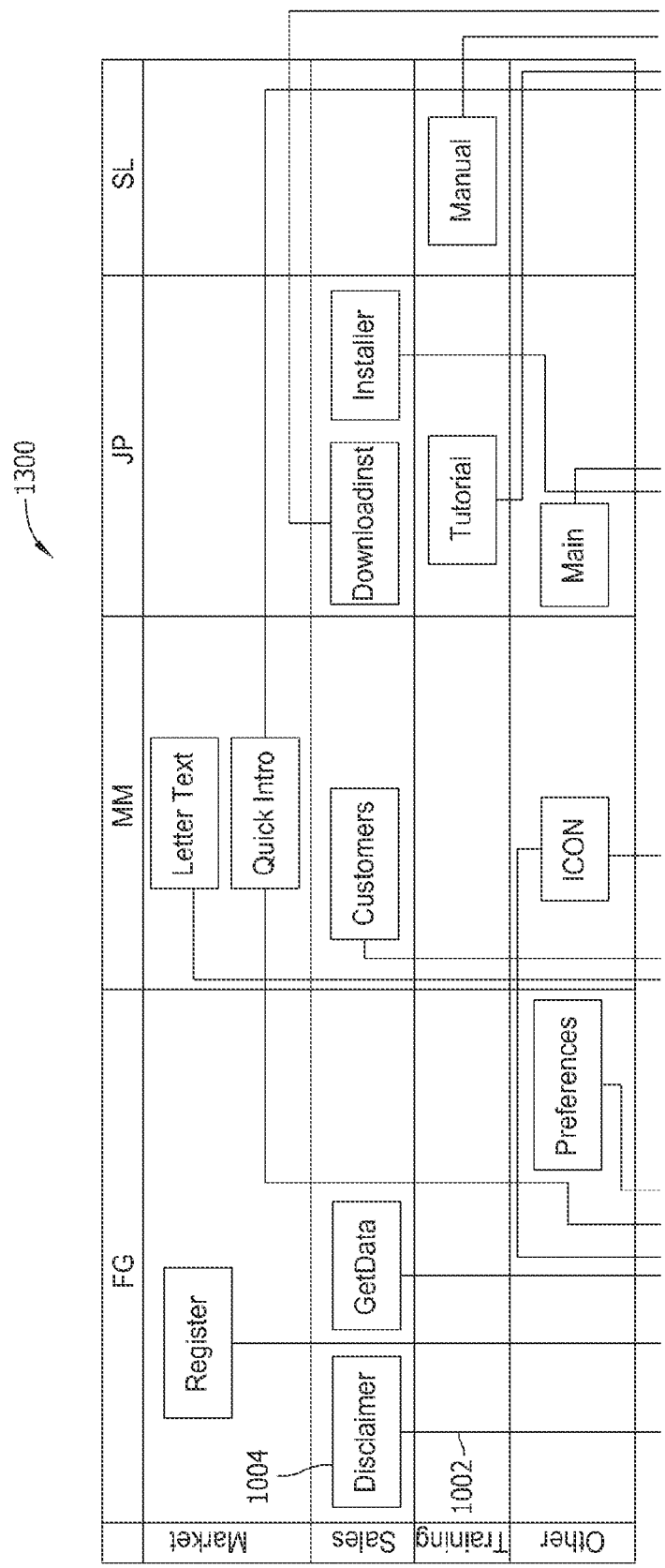
FIG. 13 is an exemplary user interface for a stratified graph wherein a portion of the graph is not displayed.

In one embodiment, portions of a graph might not be shown for simplicity. For example, FIG. 13 displays only grid 1207 portion of FIG. 12, whereas folders are not shown. In one embodiment, a user is prompted to select or focus on an abbreviated portion of a graph and see at least part of the missing graph. For example, the user might be permitted to click on an edge line 1302 descending from a Disclaimer node 1304 to see either a missing folder node Code (shown in FIG. 12) or some subset of the non-displayed folders.

A stratified graph can serve as a user interface allowing the user to access and modify the objects represented in the graph. The processor may display an interactive interface to a user associated with the objects of the graph, including at least one of:

(a) viewing the objects based upon a selected classification; and (b) allowing predefined updating operations including at least one of creating new node objects, modifying node objects, and deleting node objects.

For example, a user might be presented with the graph drawing shown in FIG. 9 and might be able to move or copy the Disclaimer files from Code to Current by selecting the Disclaimer node and dragging it to Current. As another example, a user might be able to drag a node from a first stratum to a second and in so doing, change an attribute for the node to reflect the value of the attribute for nodes in the second stratum. For example, a user might be presented with the graph drawing shown in FIG. 9 and might be able to move or copy the Disclaimer file its current stratum to the FP stratum and thereby change the owner of Disclaimer to FP.

Similarly, a user may perform standard operations with node objects. For example, a user may be permitted to select a node, by, for example, right clicking on the node, and be given a pull-down menu or other lists of predefined operations relevant to the application. For example, attributes of objects may be set or modified. In the example of files, a user might be able to change attributes, such as access constraints. A user might also be able to perform predefined operations, such as opening or printing the selected file.

Notably, classification formulas need not be restricted to single values of stored attributes, and can even use ranges and any type of operations necessary for proper classification.

Figure 14:
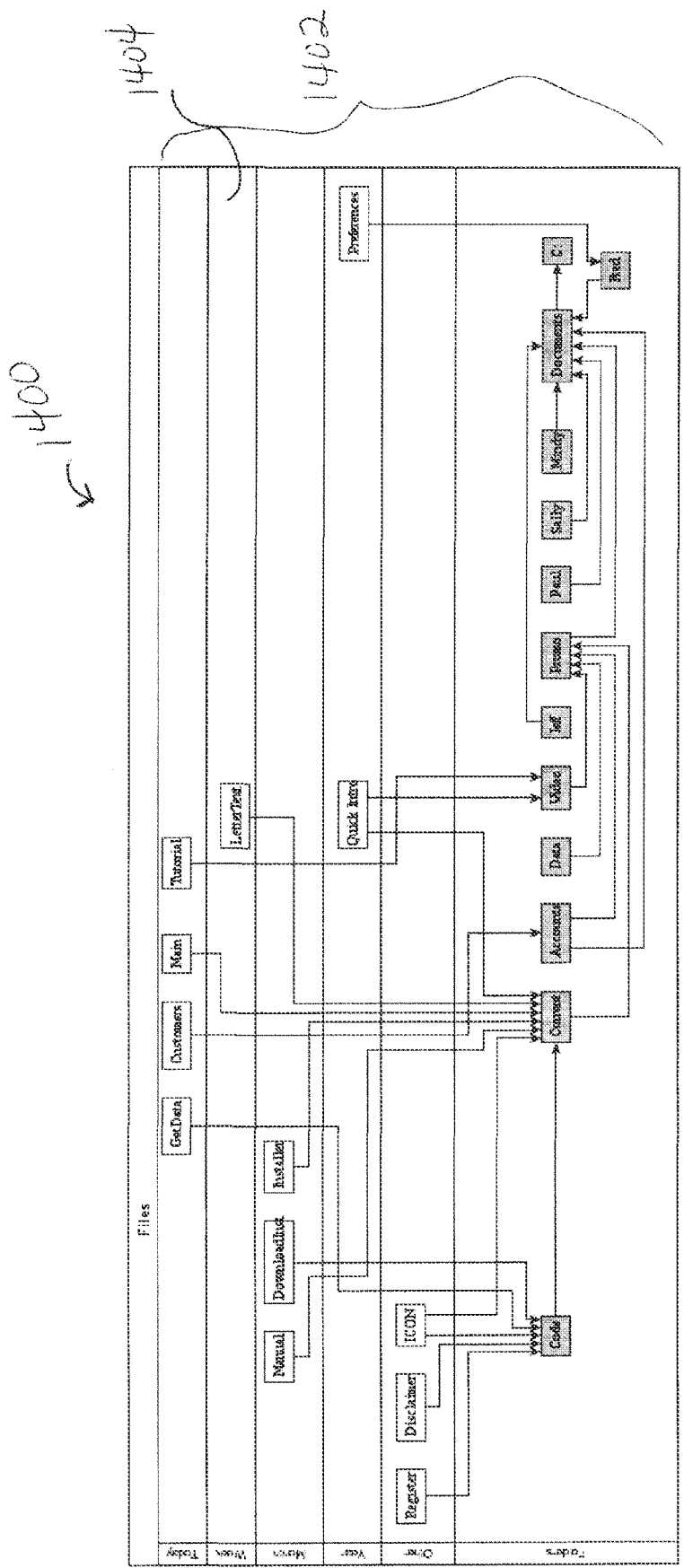
FIG. 14 is an exemplary user interface for a stratified graph wherein ranges of data values are used for classification.

FIG. 14 shows a graph 1400 illustrating a classification by modification date, wherein the formula uses ranges of dates to show strata 1402 containing all files modified within a given time period. For example, a second stratum 1404 shows files modified within a range of two to seven days ago from the time of display.

One implementation would allow additional nodes to be displayed in addition to object nodes. For example, values of attributes associated with object nodes might be displayed as separate nodes with an edge to the associated object node. Similarly, comments and other application-specific values may be displayed as nodes.

One embodiment permits strata to be hidden and shown. For example, a user might be permitted to toggle between allowing a given stratum to be hidden or visible. This option might also be handled programmatically based on attributes or other criteria.

Various other embodiments permit a user to select a node and modify display characteristics of the node in the graph depiction. For example, a user might be able to request any of the following:

(a) to hide the node or node type;

(b) to place all the nodes of the node type into a separate stratum;

(c) to visually deemphasize or emphasize the node or node type; and (d) to reclassify the node or node type nodes into a different stratum.

In addition, nodes and edges of different types may be presented differently. For example, nodes representing files might contain or be shaped as icons indicating the file type, application or application class for the file. A user might then see clearly that a file is a PDF file, a textual file, or other type of file based on the icon used to display the file in the graph depiction.

In one embodiment, a stratified graph is stored and displayed again from memory. An identifier of the graph and a sort order, as well as any other information relevant to the depiction of the graph may be stored for subsequent processing and/or display. In addition, a tool may be provided for generating stratified graphs from a plurality of data sources, wherein the tool may permit a user to specify a location for data and formulas for classification, as well as other information relevant to presenting stratified graphs.

Draw a graph such that the nodes of the graph are stratified into designated node areas based upon a set of properties of the objects represented by the nodes. A database or other source of object information can be identified, along with a formula or other designation of which properties of an identified object determine its strata, and a processor can place nodes representing the objects into appropriate strata in a graph depiction, rendering the edges joining them as lines. Algorithms might be optimized for primary trees or other subgraphs to appear attractively (for example, without any edge crossings). This approach would have value for swim lane diagrams, as well as for presenting any graph hierarchically for clarity based upon application-specific needs, such as showing resources by region.

Embodiments described above present strata in straight rows or columns. Other shapes of strata are also contemplated and may enhance the visual effect and/or interpretation of presented graphs. For example, in some embodiments, strata are depicted in a curved (e.g., elliptical, circular, ovular, arced, and/or curvilinear) shape. Such embodiments facilitate drawing straight hierarchical connectors between nodes in a stratum without requiring exceptional staggering of the nodes.

The fact that a stratified graph has segments of the graph separated already (e.g., by node type) leads to the potential for projecting the strata onto desired shapes and/or images. When only one or two strata are presented, elliptical (e.g., circular) or arced strata may be presented. Elliptical or arced strata may be useful when distinguishing a selected group of nodes from unselected nodes based on an attribute of interest. For example, if the hierarchy represents the management hierarchy of a company, elliptical strata may be used to distinguish a group of managers selected for an annual productivity award from those not selected. When more than two strata are presented, the top two strata may be represented in an elliptical or arced form as well. In some embodiments, the shape of one or more strata is conformed to a desired shape or image. For example, strata may be drawn in complex curves, including logos and other pictures, as long as a user (e.g., an interface designer) or an automated process specifies the path and/or the boundaries of each stratum.

Allowing curved lines between the nodes may allow segments that do not run the full length of the image. In effect, nodes in one or more portions of a strata could be positioned where they are desired (e.g., according to a desired spatial distribution specified by a default setting and/or by a user), and the hierarchical connectors extending from the nodes may include one or more vertices and/or be extended in curves to connect the endpoint nodes without intersecting other nodes and/or other hierarchical connectors.

Graphical representations as described herein may be drawn using various drawing algorithms, which may be iterative or recursive. For simplicity, in the examples contained herein the strata are drawn vertically. However, the implementation may be applied to strata drawn horizontally, diagonally, and/or in any orientation.

Some embodiments enable truncation of one or more portions of a graph, and especially branches of a tree that constitutes at least a portion of the graph. For example, a graphical representation of a hierarchy may present a selected portion of the hierarchy, such as a list of favorite files. In such a scenario, the graphical representation may include only the selected nodes and the set of nodes (e.g., directly related and/or interconnecting nodes) needed to connect them to one another using hierarchical connectors, or alternatively to connect them to the root of the hierarchy. In the case of such truncation, a user may be permitted to click on any node to add its adjacent nodes to the tree, so that the user could traverse the tree to select new nodes.

Operations described herein may be performed by a computer or computing device. A computer or computing device includes one or more processors or processing units and at least one memory device, such as a system memory and/or some form of computer-readable media. By way of example and not limitation, computer-readable media comprise computer storage media and communication media. Computer storage media are non-transitory and include volatile and nonvolatile, removable and non-removable media implemented in any method or technology for storage of information such as computer-readable instructions, data structures, program modules or other data. Communication media typically embody computer-readable instructions, data structures, program modules, or other data in a modulated data signal such as a carrier wave or other transport mechanism and include any information delivery media. Combinations of any of the above are also included within the scope of computer-readable media.

In exemplary embodiments, any portion or the entirety of the operations described herein are encoded as computer-executable instructions, which are embodied on one or more non-transitory computer-readable media. When executed by at least one processor, the computer-executable instructions cause the processor to perform the encoded operations.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. One or more non-transitory computer-readable media having computer-executable instructions embodied thereon, wherein when executed by a processor, the computer-executable instructions cause the processor to:
   identify a graph having a plurality of nodes, wherein a node represents a stored object having one or more attributes associated with a primary application, and edges represent stored relationships between objects, an attribute being any information associated with an object other than information pertaining to an edge relationship;
   receive a selection formula, wherein the formula classifies the objects into categories of attributes and values of attributes within the categories; and
   automatically depict a visual representation of the graph on a display, wherein two distinct organizations of the graph are portrayed simultaneously:
   in the first organization, the edge relationships between objects are preserved and displayed; and
   in the second organization, nodes are organized into and displayed as a plurality of visually distinct classification node areas based upon the formula; wherein:
   the classification node areas correspond to different attribute values within a category; and
   the classification node areas are not differentiated based upon any edge relationships, but rather upon values of attributes.

2. One or more non-transitory computer-readable media in accordance with claim 1, wherein the computer-executable instructions further cause the processor to:
   identify an order between or among the categories; and
   depict the graph with the corresponding classification node areas ordered according to the identified order.

3. One or more non-transitory computer-readable media in accordance with claim 1, wherein the computer-executable instructions further cause the processor to:
   identify a second formula for classification of the objects; and
   subpartition at least one classification node area based upon the second formula.

4. One or more non-transitory computer-readable media in accordance with claim 1, wherein the computer-executable instructions further cause the processor to receive an identification of the objects and their classifying attributes from a data collection, using at least one of automatic programmatic selection of stored data objects and attributes, and user-interactive selection of stored data objects and attributes.

5. One or more non-transitory computer-readable media in accordance with claim 1, wherein the computer-executable instructions further cause the processor to display an interactive interface to a user associated with objects of the graph, said interface enabling the user to perform at least one of:
   (a) viewing the objects based upon user selected criteria; and
   (b) allowing predefined updating operations, including at least one of creating new node objects, modifying node objects, and deleting node objects.

6. One or more non-transitory computer-readable media in accordance with claim 1, wherein the computer-executable instructions further cause the processor to display an acyclical hierarchy of primary edges without any primary edge lines crossing any other primary edge lines.

7. One or more non-transitory computer-readable media in accordance with claim 6, wherein the computer-executable instructions further cause the processor to display edges not contained in the hierarchy of primary edges in a manner visually distinguished from depiction of the primary edges.

8. A computer-implemented method for generating a visual depiction of related data using attributes of the data to position representations of the data on a display, said method comprising:

identifying a graph having a plurality of nodes, wherein a node represents a stored object having one or more attributes associated with a primary application, and edges represent stored relationships between objects, an attribute being any information associated with an object other than information pertaining to an edge relationship;

receiving a selection formula, wherein the formula classifies the objects into categories of attributes and values of attributes within the categories; and automatically depicting a visual representation of the graph on a display wherein two distinct organizations of the graph are portrayed simultaneously:

in the first organization, the edge relationships between objects are preserved and displayed; and in the second organization, nodes are organized into and displayed as a plurality of visually distinct classification node areas based upon the formula, wherein:

the classification node areas correspond to different attribute values within a category; and the classification node areas are not differentiated based upon any edge relationships, but rather upon values of attributes.

9. A method in accordance with claim 8, further comprising:

identifying an order between or among the categories; and depicting the graph with the corresponding classification node areas ordered according to the identified order.

10. A method in accordance with claim 8, further comprising:

identifying a second formula for classification of the objects; and subpartitioning at least one classification node area based upon the second formula.

11. A method in accordance with claim 8, further comprising receiving an identification of the objects and their classifying attributes from a data collection, using at least one of automatic programmatic selection of stored data objects and attributes, and user-interactive selection of stored data objects and attributes.

12. A method in accordance with claim 8, further comprising displaying an interactive interface to a user associated with objects of the graph, said interface enabling the user to perform at least one of:

(a) viewing the objects based upon user selected criteria; and (b) allowing predefined updating operations, including at least one of creating new node objects, modifying node objects, and deleting node objects.

13. A method in accordance with claim 8, further comprising displaying an acyclical hierarchy of primary edges, wherein no primary edge line crosses any other primary edge line.

14. A method in accordance with claim 13, further comprising displaying edges not contained in the hierarchy of primary edges in a manner visually distinguished from depiction of the primary edges.

15. Apparatus comprising:

a display; and a processor coupled to the display and programmed to:

identify a graph having a plurality of nodes, wherein a node represents a stored object having one or more attributes associated with a primary application, and edges represent stored relationships between objects, an attribute being any information associated with an object other than information pertaining to an edge relationship;

receive a selection formula, wherein the formula classifies the objects into categories of attribute and values of attributes within the categories; and automatically depict on the display a visual representation of the graph wherein two distinct organizations of the graph are displayed simultaneously:

in the first organization, the edge relationships between objects are preserved and displayed; and in the second organization, nodes are organized into and displayed as a plurality of visually distinct classification node areas based upon the formula; wherein:

the classification node areas correspond to different attribute values within a category; and the classification node areas are not differentiated based upon any edge relationships, but rather upon values of attributes.

16. Apparatus in accordance with claim 15, wherein the processor is further programmed to:

identify an order between or among the categories; and depict the graph with the corresponding classification node areas ordered according to the identified order.

17. Apparatus in accordance with claim 15, wherein the processor is further programmed to:

identify a second formula for classification of the objects; and subpartition at least one classification node area based upon the second formula.

18. Apparatus in accordance with claim 15, wherein the computer-executable instructions further cause the processor to receive an identification of the objects and their classifying attributes from a data collection, using at least one of automatic programmatic selection of stored data objects and attributes, and user-interactive selection of stored data objects and attributes.

19. Apparatus in accordance with claim 15, wherein the computer-executable instructions further cause the processor to display an interactive interface to a user associated with objects of the graph, said interface enabling the user to perform at least one of:

(a) viewing the objects based upon user selected criteria; and (b) allowing predefined updating operations, including at least one of creating new node objects, modifying node objects, and deleting node objects.

20. Apparatus in accordance with claim 15, wherein the computer-executable instructions further cause the processor to display an acyclical hierarchy of primary edges without any primary edge lines crossing any other primary edge lines.

* * * * *